H. S. MUSTIN.
STEERING DEVICE.
APPLICATION FILED APR. 28, 1909.

956,718.

Patented May 3, 1910.
2 SHEETS—SHEET 2.

Witnesses,
L. S. Mann.
S. N. Pond.

Inventor,
Herbert S. Mustin
By Offield, Towle Linthicum
Attys.

UNITED STATES PATENT OFFICE.

HERBERT S. MUSTIN, OF CHICAGO, ILLINOIS, ASSIGNOR TO AUSTIN MANUFACTURING COMPANY, OF CHICAGO, ILLINOIS, A CORPORATION OF ILLINOIS.

STEERING DEVICE.

956,718.  Specification of Letters Patent.  Patented May 3, 1910.

Application filed April 28, 1909. Serial No. 492,750.

*To all whom it may concern:*

Be it known that I, HERBERT S. MUSTIN, a citizen of the United States, residing at Chicago, in the county of Cook and State of Illinois, have invented certain new and useful Improvements in Steering Devices, of which the following is a specification.

This invention relates generally to a steering device adaptable for all classes of vehicles, but more particularly intended as a steering mechanism for motor rollers or lawn mowers.

In the present forms of steering devices for motor rollers and lawn mowers, the gearing is such that the turning of the vehicle is in a comparatively high ratio to the turning movement of the steering wheel. The result of this is that it is extremely difficult to roll or cut on a straight line, since the swerving and turning of the machine in its path, due to unevenness, irregularity and obstructions in the ground traversed, renders it a difficult task to hold the steering wheel against movement; the result being a ragged or uneven cut, which necessitates the recutting of the portion left uncut. There are times, however, in cutting grass or rolling lawns or roads, when it is very advantageous to turn sharply and to have the vehicle respond quickly or in a high ratio to a turning movement of the steering wheel. But ordinarily it is desirable to have a relatively slow or gradual response in the turning movement of the machine to the turning movement of the steering wheel in order that the vehicle may at all times be under perfect control, and the lawn cut or rolled in straight lines or paths.

The general object of the present invention is to provide a steering device that shall be capable of effecting either a quick or a gradual response of the vehicle to the turning movement of the steering wheel; or, more strictly stated, that shall effect either a high or a low ratio of turning movement of the vehicle relatively to the turning movement of the steering wheel, as circumstances may require.

Other minor objects and advantages of the invention will be apparent from the following description, taken in connection with the accompanying drawings which illustrate one practical embodiment of the invention, and in which—

Figure 1:
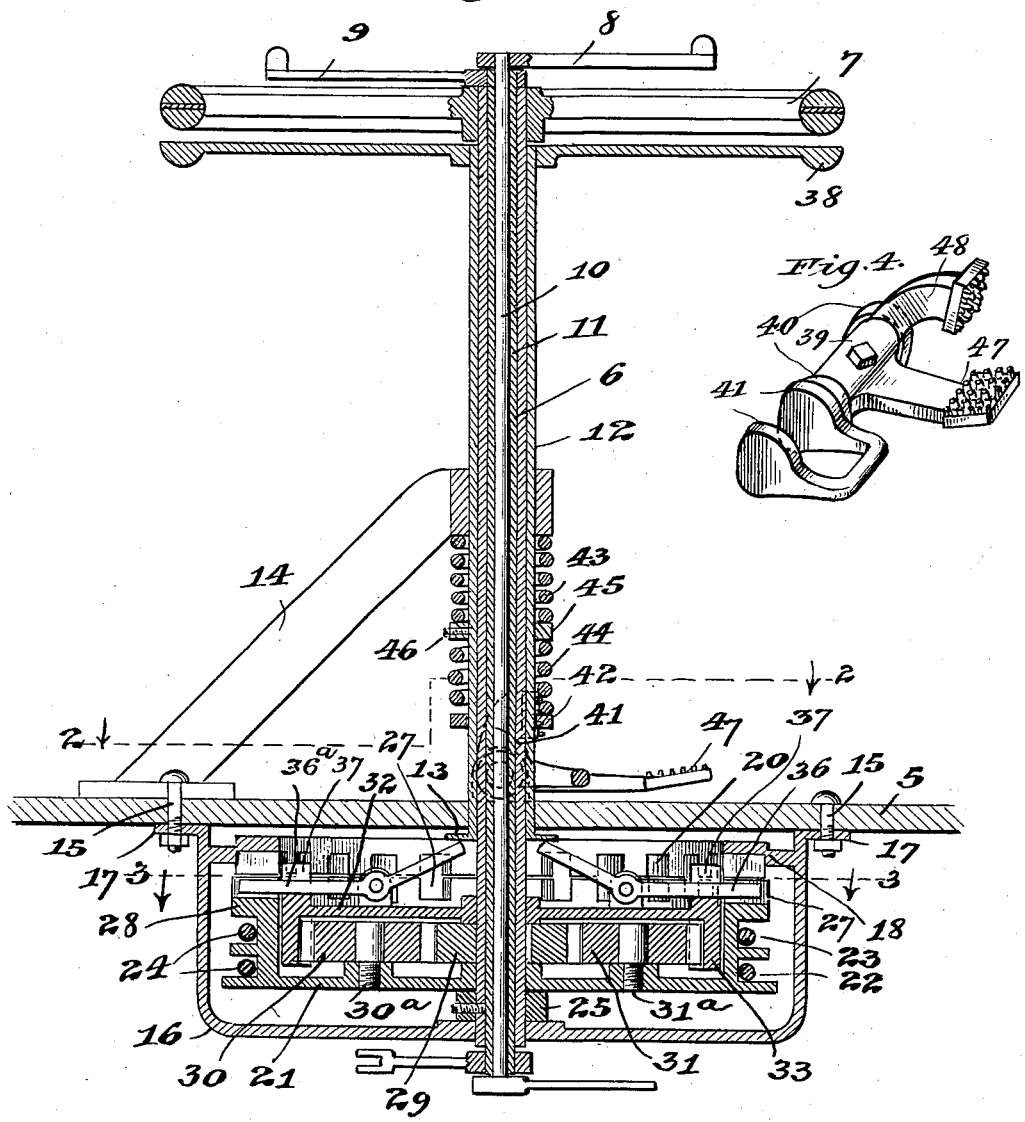
Figure 2:
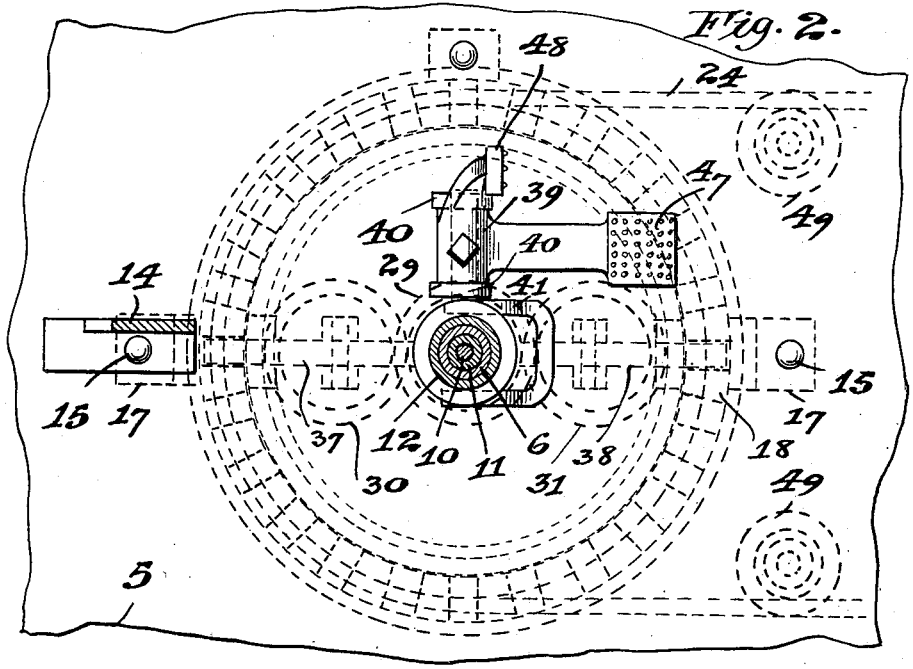
Figure 3:
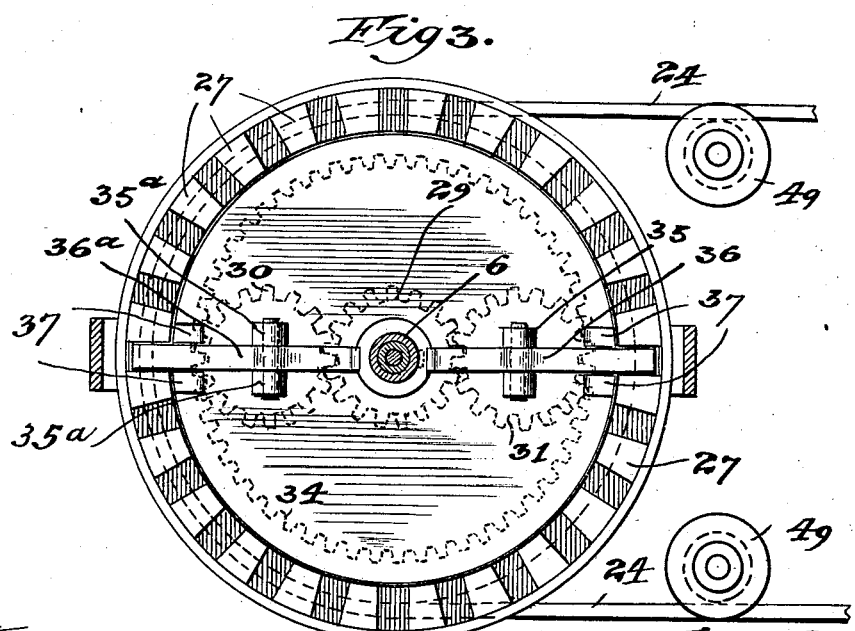

Figure 1 is a vertical section of my improved steering device shown as applied to the platform of the vehicle. Fig. 2 is a horizontal section on the offset line 2—2 of Fig. 1, looking downwardly. Fig. 3 is a similar section on the line 3—3 of Fig. 1; and Fig. 4 is a perspective detail of a foot-operated cam controlling the speed-shifting devices of the steering gear.

Referring to the drawings, 5 designates the floor or platform of the vehicle to which the device as a whole is attached.

6 is the steering column proper, hollow in cross-section, and to which is secured the usual steering wheel 7. In the particular embodiment of the invention shown, the steering column is designed for use in connection with an explosive motor, and therefore has connected therewith the levers 8 and 9 for the control of the gaseous mixture and the sparking mechanism, which levers are connected, respectively, to rods 10 and 11 extending axially through the hollow main steering column 6.

Surrounding the steering column 6 is a sleeve 12 slidably mounted thereon, the lower end of which sleeve terminates in an annular flange 13 located below the floor or platform 5. A brace 14 at its upper end surrounds the sleeve 12, and at its lower end is secured to the floor by means of a bolt 15, for the purpose of maintaining the steering column and its associated parts rigidly in an upright position.

Beneath the platform 5 is a gear casing 16 carrying the main parts of the steering mechanism; said casing having marginal lugs 17 through which bolts 15 pass to secure the casing to the platform. Rigid and preferably integral with the casing 16 is an internal ratchet-ring 18 having formed on its under side a series of locking notches 20. Disposed below the ratchet-ring 18 is a steering drum or hollow pulley 21, the periphery of which is provided with grooves 22 and 23 for chains or cables 24 leading to lever mechanism or to the axle of the vehicle, as the case may be, for effecting the turning movement of the latter. The drum 21 is rotatably mounted on the main steering column 6, and rests upon a bearing-block or collar 25 which is keyed to the steering column and in turn rests upon the bottom of the gear casing 16. The upper edge of the drum 21 is also formed as an annular ratchet, being provided with a series of locking notches 27 similar to and opposite the notches 20 in the ratchet-ring 18. Within the drum 21 are a series of spur gears 29, 30 and 31, the gear 29 being fast on the main steering column 6, and the gears 30 and 31 being rotatably mounted on journal pins 30ᵃ and 31ᵃ strongly secured in the bottom wall of the drum 21. Overlying the gears 29, 30 and 31 and rotatably mounted on the steering post 6 is a large gear 32 having a depending marginal flange 33 which is internally toothed, as shown at 34 (Fig. 3). The central gear 29 is in mesh with the gears 30 and 31, while the latter are in mesh with the internal gear 32.

Formed upon the top surface of the gear 32 on opposite sides of the main column 6 are two pairs of lugs 35 and 35ᵃ, between which locking dogs 36 and 36ᵃ are pivoted. These locking dogs are in the form of angle-levers pivoted at their elbows, the longer outwardly projecting arms of which extend into the region of the annular rows of locking notches above described, while their inner shorter arms project beneath the flange 13 of the sleeve 12. The outwardly projecting longer arms of these locking dogs also lie between upstanding lugs 37 formed on the upper face of the gear 32 at or near the outer edge thereof, which latter are for the purpose of relieving the pivots of the dogs of strain, as will hereinafter appear.

From the foregoing it will be apparent that when the locking dogs 36 and 36ᵃ are in the positions shown in Fig. 1, they lock together the drum 21 and the internal gear 32. Consequently, when the steering column is turned, the planet gears 30 and 31 cannot turn on their own bearings, and the central gear 29 imparts, through the planet gears 30 and 31 and their bearing spindles 30ᵃ and 31ᵃ, a direct turning movement to the pulley or drum 21 which is angularly co-equal with the angular turning movement of the steering wheel. When, however, it is desired to reduce the ratio of turning movement of the pulley or drum 21 relatively to that of the steering wheel, (which is the case in the normal operation of the mechanism) the locking dogs 36 are tilted on their pivots, by the depression of the flange 13 (as hereinafter described) which throws the outer ends of the outer arms of said dogs out of the notches of the drum or pulley and into engagement with the notches of the rigid ratchet-ring 18. This locks the internal gear 32 against rotary movement; and, consequently, the turning of the steering wheel, steering column, and central gear 29, causes the planet gears 30 and 31, through their engagement with the then stationary internal gear 32, to move bodily around the axis of the steering column but at a considerably reduced rate of travel, thereby rotating the drum or pulley 21 at a much reduced ratio of angular movement relative to the angular or turning movement of the steering column.

Any convenient manually or foot-operated means may be employed to shift the position of the locking dogs. I have herein shown for this purpose a compression spring 43 between the upper end of the brace 14 and a collar 45 secured as by a setscrew 46 to the sleeve 12, whereby the latter is normally forced downwardly, maintaining the locking dogs in engagement with the ratchet-ring 18, which maintains the mechanism in its normal position. The sleeve 12 is adapted to be raised by an auxiliary hand-wheel 38 secured to its upper end below the steering wheel 7; and when the sleeve is raised it is secured in such position by a cam 41 beneath a washer 42 slidably mounted on the sleeve 12, and engaging a cushioning spring 44 between said washer and the fixed collar 45. Said cam 41 has a laterally extending spindle or shaft rotatably mounted in bearing-lugs 40 on the platform 5; and keyed to said shaft is a hub 39 rigid with which are radially extending foot levers 47 and 48. When said levers are in the position shown in Fig. 1, the high part of the cam 41 rests beneath the washer 42, and thus supports the sleeve in elevated position. By throwing the lever 48 over to substantially horizontal position, the cam 41 is rocked so as to permit the spring 43 to depress the sleeve 12.

The cushioning spring 44 and sliding washer 42 are not absolutely necessary, since the cam might operate directly on the collar 45. But I prefer the use of the cushioning spring 44, since it absorbs any lifting effects resulting from accidental vibration of the foot lever under shocks and jars which might otherwise tend to raise the sleeve 12 sufficiently to allow the locking dogs to accidentally drop into the quick steering position.

At 49 I show a pair of guide-sheaves that are rotatably journaled below the platform 5 and constitute guides for the chains or cables 24.

From the foregoing it will be understood that the auxiliary hand-wheel 38 is normally in the lowered position corresponding to the slow-speed position of the steering mechanism, which is its normal position for ordinary work, in which position the tendency of the machine to run out of a straight line is easily controlled by the operator at the steering wheel owing to the increased leverage afforded by the slow-speed position of the gear. When, however, it is desirable or necessary to make a quick turn, as in getting around a tree or turning a corner, the operator grasps and raises the auxiliary hand-wheel 38 and at the same time, through the foot-lever 47, throws the cam 41 to supporting position relatively to the sleeve 12, which frees the inner arms of the locking dogs and permits their outer arms to drop into interlocking engagement with the hollow pulley 21, whereupon the angular movement of the steering wheel 7 is imparted without reduction to the pulley 21.

It will be evident to those skilled in the art that variations and modifications in respect to details might be made in the mechanism as described and shown without involving any departure from the invention or sacrificing any of the advantages secured thereby; and consequently I do not limit the invention to the mechanism shown and described, except to the extent clearly indicated in specific claims.

I claim:

1. In a steering device for power-propelled mowers, rollers, and the like, the combination with a steering column, of a transmission drum mounted coaxially with said steering column, and driving connections between said steering column and transmission drum adapted to impart to the latter a variable extent of turning movement relative to the turning movement of said steering column.

2. In a steering device for power-propelled mowers, rollers, and the like, the combination with a steering column, of a transmission drum loosely mounted on said steering column, variable-speed driving connections between said steering column and transmission drum, and manually operable means whereby said driving connections may be caused to impart to said drum a turning movement either coextensive with or less than the turning movement of said steering column.

3. In a steering device for power-propelled mowers, rollers, and the like, the combination with a steering column, of a transmission drum loosely mounted on said steering column, an internal gear also loosely mounted on said steering column, a central gear fast on said steering column, a planet gear rotatably mounted on said drum between and meshing with said central gear and said internal gear, a stationary member adjacent to said drum, and manually controlled means for locking said internal gear to either said stationary member or said drum.

4. In a steering device for power-propelled mowers, rollers, and the like, the combination with a steering column, of a transmission drum loosely mounted on said steering column and formed with an annular series of locking notches, an internal gear also loosely mounted on said steering column, a central gear fast on said steering column, a planet gear rotatably mounted on said drum between and meshing with said central gear and said internal gear, a stationary ring having a series of locking notches opposite said drum, locking dogs mounted on said internal gear, and manually controlled means for effecting the locking engagement of said dogs with the notches of either said stationary ring or said drum.

5. In a steering device for power-propelled mowers, rollers, and the like, the combination with a steering column, of a transmission drum loosely mounted on said steering column and formed with an annular series of locking notches, an internal gear also loosely mounted on said steering column, a central gear fast on said steering column, a planet gear rotatably mounted on said drum between and meshing with said central gear and said internal gear, a stationary ring having a series of locking notches opposite said drum, locking dogs pivotally mounted on said internal gear and normally engaging the notches of said drum, spring-actuated means mounted on said steering column for throwing said locking dogs into engagement with the notches of said stationary ring, and manually operable means for retracting said dog-actuating means.

HERBERT S. MUSTIN.

Witnesses:
JAMES R. OFFIELD,
M. E. ADAMS.